United States Patent
Kim et al.

(10) Patent No.: US 11,641,011 B2
(45) Date of Patent: May 2, 2023

(54) SECONDARY BATTERY AND METHOD FOR MANUFACTURING THE SAME

(71) Applicant: LG CHEM, LTD., Seoul (KR)

(72) Inventors: Dae Soo Kim, Daejeon (KR); Young Deok Kim, Daejeon (KR); Song Yi Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 133 days.

(21) Appl. No.: 16/753,589

(22) PCT Filed: Jun. 27, 2019

(86) PCT No.: PCT/KR2019/007820
§ 371 (c)(1),
(2) Date: Apr. 3, 2020

(87) PCT Pub. No.: WO2020/013486
PCT Pub. Date: Jan. 16, 2020

(65) Prior Publication Data
US 2020/0335763 A1    Oct. 22, 2020

(30) Foreign Application Priority Data
Jul. 9, 2018   (KR) ........................ 10-2018-0079285

(51) Int. Cl.
*H01M 10/04*   (2006.01)
*H01M 50/531*   (2021.01)
(Continued)

(52) U.S. Cl.
CPC ......... *H01M 50/531* (2021.01); *H01M 4/043* (2013.01); *H01M 4/139* (2013.01);
(Continued)

(58) Field of Classification Search
CPC ........ H01M 4/043; H01M 4/139; H01M 4/62; H01M 10/04; H01M 10/0585;
(Continued)

(56) References Cited

U.S. PATENT DOCUMENTS 8,092,936 B2   1/2012   Xiankai et al.
8,708,321 B2   4/2014   Hong
(Continued)

FOREIGN PATENT DOCUMENTS

CN   106252659 A   12/2016
JP   3403678 B2   5/2003
(Continued)

OTHER PUBLICATIONS

Extended European Search Report issued in corresponding European Patent Application No. 19834295.8 dated Dec. 8, 2020.
(Continued)

*Primary Examiner* — Raymond Alejandro
(74) *Attorney, Agent, or Firm* — Morgan, Lewis & Bockius LLP

(57) ABSTRACT

An electrode assembly comprising a first unit electrode in which a plurality of first electrodes entirely made of a first electrode mixture having a solid shape are connected to each other; a second unit electrode in which a plurality of second electrodes entirely made of a second electrode mixture having a solid shape are connected to each other; a separator interposed between the first unit electrode and the second unit electrode; and an electrode tab comprising a plurality of first electrode tab provided on the first unit electrode and a plurality of second electrode tab provided on the second unit electrode.

11 Claims, 9 Drawing Sheets

(51) Int. Cl.
  *H01M 4/04* (2006.01)
  *H01M 4/139* (2010.01)
  *H01M 4/62* (2006.01)
  *H01M 10/0585* (2010.01)
  *H01M 10/42* (2006.01)
  *H01M 10/44* (2006.01)
  *H01M 50/572* (2021.01)

(52) U.S. Cl.
  CPC .............. *H01M 4/62* (2013.01); *H01M 10/04* (2013.01); *H01M 10/0585* (2013.01); *H01M 10/425* (2013.01); *H01M 10/441* (2013.01); *H01M 50/572* (2021.01)

(58) Field of Classification Search
  CPC ............. H01M 10/425; H01M 10/441; H01M 50/531; H01M 50/572
  See application file for complete search history.

(56) References Cited

U.S. PATENT DOCUMENTS

| | | | |
|---|---|---|---|
| 8,968,910 | B2 | 3/2015 | Kim et al. |
| 9,478,829 | B2 | 10/2016 | Wang et al. |
| 2009/0159347 | A1 | 6/2009 | Zhou et al. |
| 2009/0305120 | A1 | 12/2009 | Blomgren et al. |
| 2012/0021255 | A1 | 1/2012 | Kim |
| 2013/0029212 | A1 | 1/2013 | Hong |
| 2013/0196210 | A1 | 8/2013 | Kim et al. |
| 2014/0030579 | A1 | 1/2014 | Kim et al. |
| 2014/0272504 | A1 | 9/2014 | Edington et al. |
| 2014/0342194 | A1 | 11/2014 | Wang et al. |
| 2015/0155528 | A1 | 6/2015 | Takahashi et al. |
| 2016/0072121 | A9* | 3/2016 | Dhar ....................... H01M 4/14 429/210 |
| 2017/0353042 | A1* | 12/2017 | Liu ..................... H01M 10/441 |

FOREIGN PATENT DOCUMENTS

| | | |
|---|---|---|
| JP | 2004-047239 A | 2/2004 |
| KR | 2011-0096106 A | 8/2011 |
| KR | 10-2012-0010061 A | 2/2012 |
| KR | 10-1224172 B1 | 1/2013 |
| KR | 10-2013-0014371 A | 2/2013 |
| KR | 10-2013-0119457 A | 10/2013 |
| KR | 10-2016-0008617 B1 | 1/2016 |
| KR | 10-2016-0027364 A | 3/2016 |
| KR | 10-2016-0086795 A | 7/2016 |
| KR | 10-1781487 B1 | 9/2017 |
| WO | 2009/149231 A2 | 12/2009 |

OTHER PUBLICATIONS

International Search Report (with partial translation) and Written Opinion issued in corresponding International Patent Application No. PCT/KR2019/007820, dated Oct. 7, 2019.

* cited by examiner (a) VARIATION IN POSITIVE ELECTRODE RESISTANCE (b) VARIATION IN NEGATIVE ELECTRODE RESISTANCE

SECONDARY BATTERY AND METHOD FOR MANUFACTURING THE SAME

CROSS-REFERENCE TO RELATED APPLICATION

The present application claims the benefit of the priority of Korean Patent Application No. 10-2018-0079285, filed on Jul. 9, 2018, which is hereby incorporated by reference in its entirety.

TECHNICAL FIELD

The present invention relates to a secondary battery and a method for manufacturing the same, and more particularly, a secondary battery comprising a unit electrode having a new structure and a method for manufacturing the same.

BACKGROUND ART

In general, secondary batteries refer to chargeable and dischargeable batteries, unlike primary batteries that are not chargeable. The secondary batteries are being widely used in the fields of small and advanced electronic devices such as mobile phones, PDAs, and notebook computers.

Such a secondary battery comprises an electrode assembly, an electrode lead coupled to the electrode assembly, and a pouch accommodating the electrode assembly in a state in which a front end of the electrode lead is withdrawn to the outside. The electrode assembly has a structure in which a plurality of electrodes and a plurality of separators are alternately laminated.

Each of the electrodes comprise a collector and an electrode active material applied to the collector. That is, the electrode is manufactured by applying the liquid electrode active material to a surface of the collector at a predetermined thickness.

However, the electrode has to comprise the collector. Thus, there is a problem that it is difficult to newly design an electrode having a novel structure.

DISCLOSURE OF THE INVENTION

Technical Problem

The present invention has been made to solve the above-mentioned problem, and an object of the present invention is to provide a secondary battery capable of realizing a unit electrode having a novel structure by using an electrode made of a solid electrode mixture without a collector and particularly improving charging performance and a method for manufacturing the same.

Technical Solution

A secondary battery according to the present invention for achieving the above object comprises an electrode assembly, wherein electrode assembly comprises: a first unit electrode in which a plurality of first electrodes entirely made of a first electrode mixture having a solid shape are connected to each other; a second unit electrode in which a plurality of second electrodes entirely made of a second electrode mixture having a solid shape are connected to each other; a separator interposed between the first unit electrode and the second unit electrode; and an electrode tab comprising a plurality of first electrode tab provided on the first unit electrode and a plurality of second electrode tab provided on the second unit electrode.

The plurality of first electrode tabs and the plurality of second electrode tabs may have numbers different from each other, respectively.

When the first electrode is a positive electrode, and the second electrode is a negative electrode, the number of first electrode tabs may be less than that of second electrode tabs.

The secondary battery may further comprises a control unit configured to control the electrode assembly to be charged, wherein the control unit may adjust a charging rate of each of the first unit electrode and the second unit electrode through the plurality of first electrode tabs and the plurality of second electrode tabs.

In a process of charging the electrode assembly, when the second unit electrode increases in resistance more than that of the first unit electrode to decrease in charging rate, the control unit may disconnect a portion of the plurality of first electrode tabs provided on the first unit electrode to match the charging rates of the first unit electrode and the second unit electrode so that the first unit electrode increases in resistance to decrease in charging rate.

The second unit electrode may further comprise one or more second auxiliary electrode tabs, wherein, in a process of charging the electrode assembly, when the second unit electrode increases in resistance more than that of the first unit electrode to decrease in charging rate, the control unit may charge the second unit electrode through the second electrode tab and the second auxiliary electrode tab to match the charging rates of the second unit electrode so that the second unit electrode decreases in resistance to increase in charging rate.

The first electrode mixture may be formed by mixing at least one or more of a conductive material and a binder with the first electrode mixture, and the second electrode mixture may be formed by mixing at least one or more of the conductive material and the binder with the second electrode mixture.

The first electrode or the second electrode may be connected to each other in an area or thickness direction of the electrode.

The plurality of first electrodes or the plurality of second electrodes may form the integrated first unit electrode or the integrated second unit electrode by an adhesive property of an outer surface of the electrode.

The integrated first or second unit electrode may have integrated conductivity by conductivity of the electrode.

The first electrode tab or the second electrode tab may be formed as an electrode wire having flexibility.

A method for manufacturing a secondary battery according to the present invention comprises: an electrode manufacturing step (S10) of compressing a solid first electrode mixture to manufacture a plurality of first electrodes and compressing a solid second electrode mixture to manufacture a plurality of second electrodes; a unit electrode manufacturing step (S20) of connecting the plurality of first electrodes to each other in an area or thickness direction to manufacture a first unit electrodes and connecting the plurality of second electrodes to each other in the area or thickness direction to manufacture a second unit electrodes; an electrode tab attachment step (S30) of attaching a plurality of first electrode tabs to the first unit electrode and attaching a plurality of second electrode tabs to the second unit electrode; and an electrode assembly manufacturing step (S40) of alternately laminating the first unit electrode and the second unit electrode and interposing a separator between the first and second unit electrodes to manufacture an electrode assembly.

In the electrode tab attachment step (S30), the plurality of first electrode tabs and the plurality of second electrode tabs may have numbers different from each other, respectively, and when the first electrode is a positive electrode, and the second electrode is a negative electrode, the number of first electrode tabs may be less than that of second electrode tabs.

After the electrode assembly manufacturing step (S40), the method may further comprise an electrode assembly charging step (S50) of charging the electrode assembly, wherein, in the electrode assembly charging step (S50), the electrode assembly may be charged through the first and second electrode tabs, wherein, when the second unit electrode increases in resistance more than that of the first unit electrode to decrease in charging rate, a portion of the plurality of first electrode tabs provided on the first unit electrode may be disconnected to match charging rates of the first unit electrode and the second unit electrode so that the first unit electrode increases in resistance to decrease in charging rate.

After the electrode assembly manufacturing step (S40), the method may further comprise an electrode assembly charging step (S50) of charging the electrode assembly, wherein, in the electrode assembly charging step (S50), the electrode assembly may be charged through the first and second electrode tabs, wherein, when the first unit electrode increases in resistance more than that of the second unit electrode, the second unit electrode may be charged through the second electrode tab and the second auxiliary electrode tab to match charging rates of the first unit electrode and the second unit electrode so that the second unit electrode decreases in resistance to increase in charging rate.

Advantageous Effects

The secondary battery according to the present invention may comprise the first and second unit electrodes by connecting the plurality of electrodes made of the solid electrode mixture as a whole. The electrode mixture may be formed by further mixing at least one or more of the conductor and the binder in the electrode active material. Therefore, the first and second unit electrodes may be realized without the collector, and particularly, the first and second unit cells, each of which has the new structure in the direction in which the plurality of electrodes are connected to each other, may be designed newly.

Particularly, according to the present invention, the plurality of electrode tabs may be provided on the first unit electrode, and the plurality of second electrode tabs may be provided on the second electrode. Therefore, the charging rate of the first and second unit electrodes may be significantly improved, and thus, the charging performance of the secondary battery may be improved.

According to the present invention, the plurality of first electrode tabs and the plurality of second electrode tabs may have different numbers. When the second electrode is the positive electrode, and the first electrode is the negative electrode, the number of first electrode tabs may be less than that of second electrode tabs. This is because the resistance of the second unit electrode, which is the negative electrode, may increase more than that of the first unit electrode, which is the positive electrode, in the charging process. Thus, the first electrode tabs may be provided in number less than that of second electrode tabs. Therefore, the resistance of the first unit electrode and the second unit electrode may be uniformly adjusted to significantly improve the performance of the secondary battery.

The present invention may further comprise the control unit controlling the electrode assembly to be charged. The control unit may uniformly adjust the charging rate while adjusting the resistance of the first unit electrode and the second unit electrode through the plurality of first electrode tabs and the plurality of second electrode tabs in the charging process, thereby improving the charging performance of the secondary battery.

That is, in the charging process of the electrode assembly, when the second unit electrode increases in resistance more than that of the first unit electrode to decrease in charging rate, a portion of the plurality of first electrode tabs provided on the first unit electrode may be disconnected to increase in resistance of the first unit electrode, thereby reducing the charging rate. Therefore, the first unit electrode and the second unit electrode may have the uniform charging rate.

Also, according to the control unit of the present invention, in the process of charging the electrode assembly, when the second unit electrode increases in resistance more than that of the first unit electrode to decrease in charging rate, the second unit electrode may be charged through the second auxiliary electrode tab provided on the second unit electrode to decrease in resistance of the second unit electrode, thereby increasing in charging rate. Therefore, the first unit electrode and the second unit electrode may have the uniform charging rate.

According to the electrode assembly of the present invention, the conductive material and the binder may be further mixed with the electrode mixture to form the electrode. Therefore, the unit electrode having the conductivity and the adhesion may be realized.

According to the electrode assembly of the present invention, the electrode tab may be attached to the unit electrode, and the electrode tab may be attached to all the entire surface and edge surface of the unit electrode. Therefore, the unit electrode may be more newly designed.

According to the electrode assembly of the present invention, the electrode tab may be formed as the electrode wire having the flexibility and conductivity. Therefore, the electrode tab may be freely adjusted in position.

BRIEF DESCRIPTION OF THE DRAWINGS

FIGS. 4 and 5 are views illustrating a charged state of the secondary battery according to the first embodiment of the present invention, wherein FIG. 4 is a perspective view illustrating a first example of adjusting the charged state of the secondary battery, and FIG. 5 is a perspective view illustrating a second example of adjusting a charging rate of the secondary battery.

MODE FOR CARRYING OUT THE INVENTION

Figure 1:
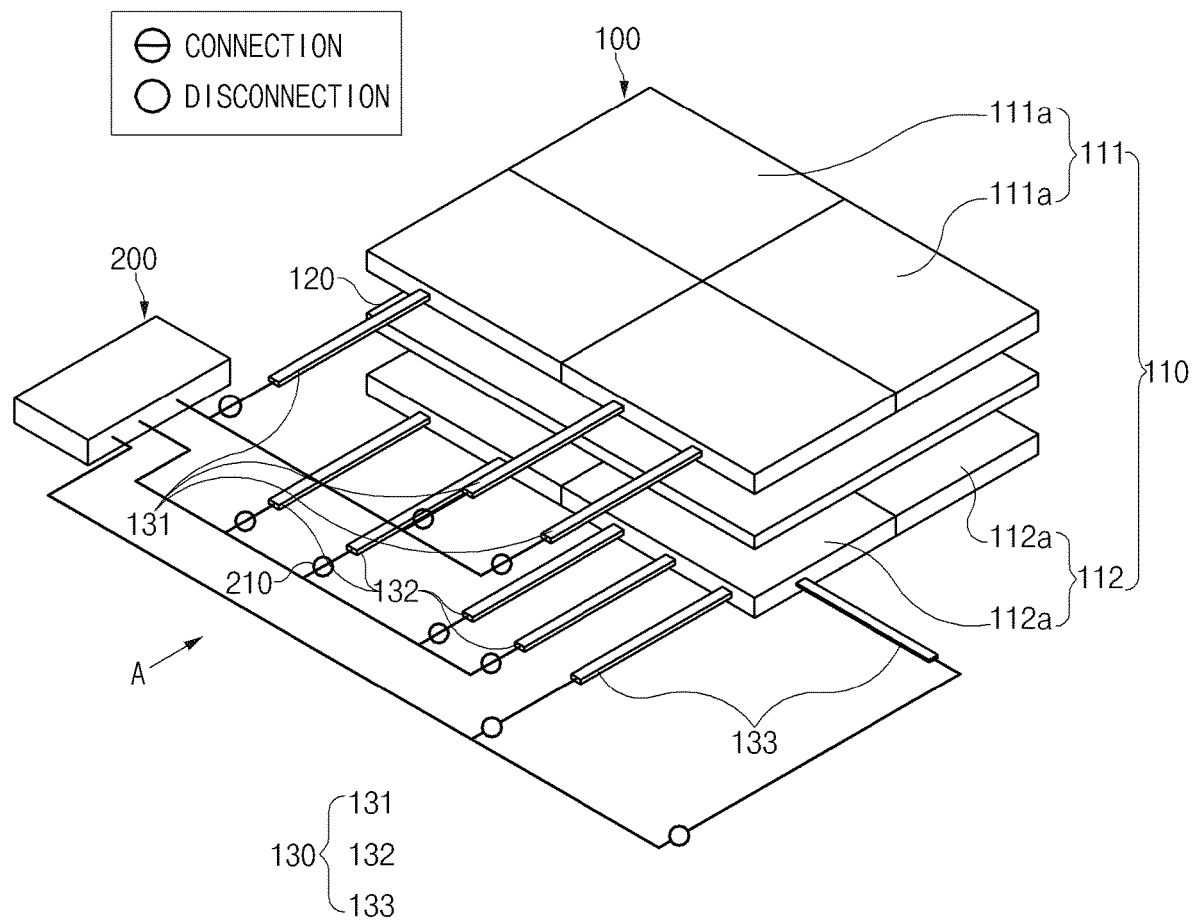
FIG. 1 is a perspective view of a secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Figure 2:
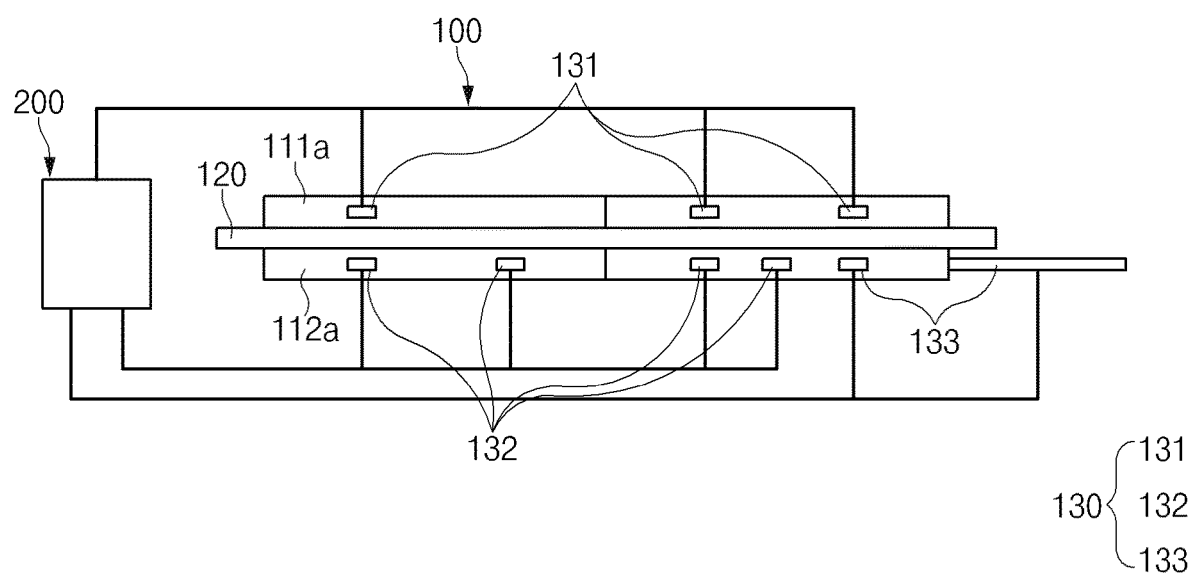
FIG. 2 is a front view of the secondary battery according to the first embodiment of the present invention.

The front view of FIG. 2 refers to a view when viewed in an 'A' direction of FIG. 1.

[Secondary Battery According to First Embodiment of the Present Invention]

A secondary battery according to a first embodiment of the present invention comprises an electrode assembly and a pouch accommodating the electrode assembly, and the electrode assembly has a structure in which a plurality of unit electrodes and a plurality of separators are alternately laminated.

Here, the unit electrode may be formed by connecting a plurality of electrodes, each of which is entirely made of a solid electrode mixture, to each other without providing a collector. Thus, the unit electrode having a novel structure may be newly designed according to a direction in which the plurality of electrodes are connected to each other.

For example, as illustrated in FIGS. 1 and 2, an electrode assembly 100 has a structure in which a plurality of unit electrodes 110 and a plurality of separators 120 are alternately laminated. Each of the unit electrodes 110 is formed by connecting a plurality of electrodes to each other, and the entire electrode is made of an electrode mixture having a solid shape.

That is, the plurality of unit electrodes 110 comprise a first unit electrode 111 and a second unit electrode 112, which have polarities different from each other. The first unit electrode 111 is formed by a plurality of first electrodes 111a, each of which is entirely made of a solid first electrode mixture, to each other, and the second unit electrode 112 is formed by a plurality of second electrodes 112a, each of which is entirely made of a solid second electrode mixture, to each other.

In more detail, as illustrated in FIG. 1, the plurality of first electrodes 111a or the plurality of second electrodes 112a may be connected to each other in all area directions of the electrode to realize a unit electrode 110 comprising the first unit electrode 111 and the second unit electrode 112, each of which has a predetermined area. Therefore, an electrode assembly 100 having a predetermined area and comprising the first unit electrode 111, the second unit electrode 112, each of which has the predetermined area, and a separator 120 may be realized.

The electrode may be made of a solid electrode mixture. The solid electrode mixture may be formed by mixing at least one or more of a solid conductive material and a solid binder with an solid electrode active material. Thus, the electrode has a polarity through the electrode active material, has a conductivity through the conductive material, and has coupling and adhesion between the electrode active material and the conductive material through the binder.

For example, the first electrode 111a is formed by mixing the conductive material and the binder with a solid first electrode active material, and the second electrode 112a is formed by mixing the conductive material and the binder with a solid second electrode active material.

Thus, each of the plurality of electrodes may be made of the solid electrode mixture without the collector, and thus, all surfaces of the electrode may have adhesion. Therefore, the first unit electrode 111 and the second unit electrode 112, which are integrated with each other, may be realized.

Also, each of the plurality of electrodes may be made of the solid electrode mixture without the collector, and thus, all surfaces of the electrode may have conductivity. Therefore, the first unit electrode 111 and the second unit electrode 112, which have conductivity and are integrated with each other, may be realized.

The secondary battery according to the embodiment of the present invention comprises an electrode tab 130 attached to the unit electrode 110, and the electrode tab 130 is attached to at least one or more of an entire surface or an edge surface of the unit electrode 110.

That is, the electrode tab 130 comprises a plurality of first electrode tabs 131 attached to the first unit electrode 111 and a plurality of second electrode tabs 132 attached to the second unit electrode 112. Here, the plurality of first electrode tabs 131 are regularly or irregularly attached to one portion of the entire surface or the edge surface of the first unit electrode 111, and the plurality of second electrode tabs 132 are regularly or irregularly attached to one portion of the entire surface or the edge surface of the second unit electrode 112. Therefore, the attached position of the electrode tab 120 may be adjusted to match the shape of the battery case to significantly improve a degree of freedom in design of the secondary battery.

A second auxiliary electrode tab 133 is further attached to the second unit electrode 112.

The electrode tab 130 may be formed as an electrode wire having flexibility and conductivity. Thus, the electrode tab 130 may be bent to match an inner space of a battery case (not shown) in which the electrode assembly 100 is accommodated and thus effectively accommodate the electrode assembly 100.

Alternatively, the electrode tab 130 may be attached to a top surface of the unit electrode to effectively utilize a side space of the unit electrode, thereby realizing a more compact electrode assembly.

Thus, the secondary battery having the above-described configuration according to the first embodiment of the present invention may realize the unit electrode having a new structure by using the electrode made of the solid electrode mixture and the electrode assembly. As a result, a secondary battery having a new shape such as a circular, oval, triangular, and polygonal shape may be designed.

Figure 3:
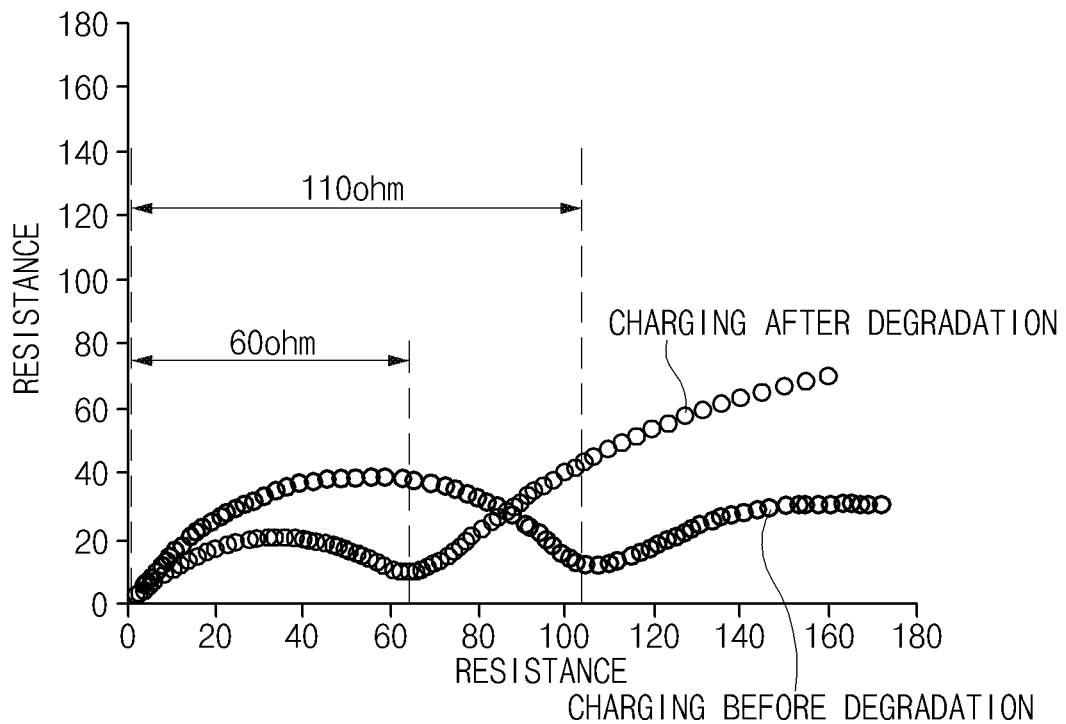
FIG. 3 is a graph illustrating resistance of a positive electrode and a negative electrode, which are generated in a process of charging the secondary battery according to the first embodiment of the present invention.
Figure 3:
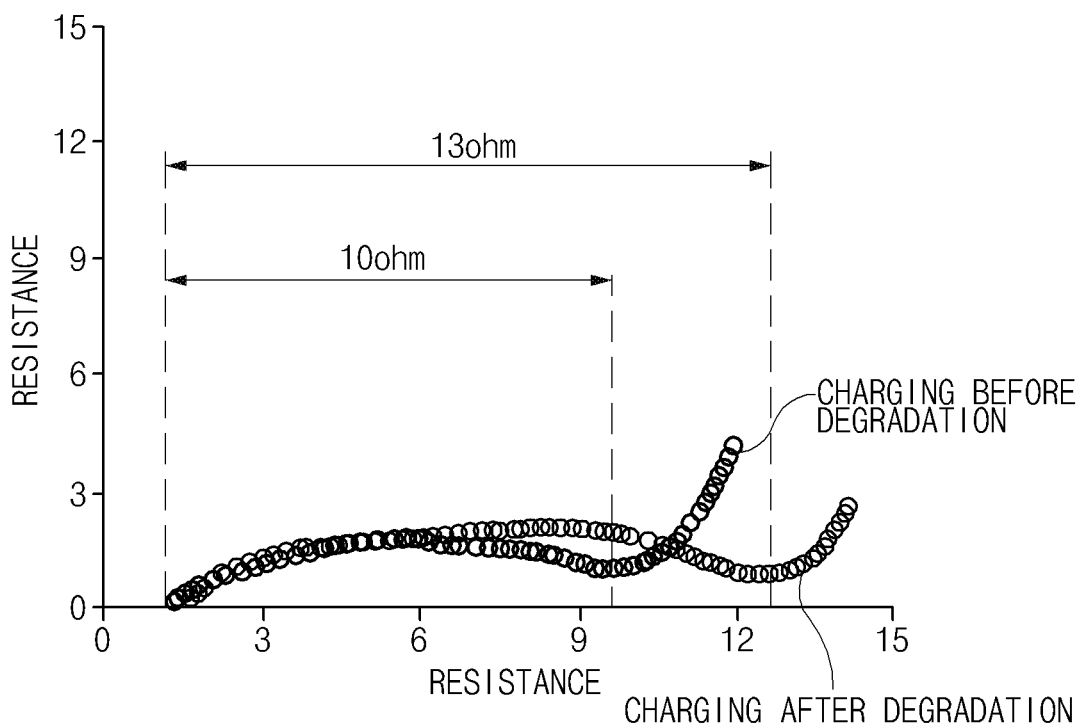

As the secondary battery is degraded during charging, a resistance increase rate of each of the positive electrode and the negative electrode occurs differently. That is, as illustrated in FIG. 3, it is confirmed that as the secondary battery degrades, resistance of the positive electrode decreases, and resistance of the negative electrode increases. Here, the degradation of the secondary battery is based on a case in which a charging capacity of the secondary battery is 80% or less.

Experimental Example

As an experimental example, FIG. 3 is a result showing a resistance increase rate of each of the positive electrode and the negative electrode according to the degradation of the secondary battery. It is seen that the resistance of the positive electrode before the degradation occurs to 100 ohm when measuring a size of a semicircle (or curve) in FIG. 3(a). Also, it is seen that resistance of the positive electrode after the degradation occurs to 60 ohm when measuring a size of a semicircle (or curve) in FIG. 3(a). Thus, it is seen that the positive electrode decreases in resistance after the degradation.

It is seen that the resistance of the negative electrode before the degradation occurs to 10 ohm when measuring a size of a semicircle (or curve) in FIG. 3(b). Also, it is seen that resistance of the negative electrode after the degradation occurs to 13 ohm when measuring a size of a semicircle (or curve) in FIG. 3(b). Accordingly, it is seen that the resistance of the negative electrode increases after the degradation.

Through the above results, the secondary battery has a large difference in resistance between the positive electrode and the negative electrode after the degradation, and as a result, the secondary battery has sudden degradation, resulting in performance deterioration.

As described above, in the secondary battery according to the first embodiment of the present invention, the resistance of the positive electrode may increase, or the resistance of the negative electrode may decrease to uniformly adjust the resistance of the positive electrode and the negative electrode. Accordingly, the performance of the secondary battery may be maintained, or the performance deterioration may be minimized.

For example, in the secondary battery according to the first exemplary embodiment, the plurality of first electrode tabs 131 and the plurality of second electrode tabs 132 have different numbers. When the first electrode 111a is a positive electrode, and the second electrode 112a is a negative electrode, the number of first electrode tab 131 is less than that of second electrode tab 132. Thus, the first electrode tab 131 may be minimized in decrease of the resistance during the charging, and the second electrode tab 132 may be minimized in increase of resistance. As a result, the difference in resistance between the first unit electrode 111 and the second unit electrode 112 may be prevented from largely occurring by the degradation of the secondary battery. In addition, the charging rates of the first unit electrode 111 and the second unit electrode 112 may be uniformly adjusted to improve the performance of the secondary battery.

The secondary battery according to the first embodiment of the present invention further comprise a control unit 200 for controlling the electrode assembly 100 to be charged. The control unit 200 controls the charging rate of each of the first unit electrode 111 and the second unit electrode 112 through the plurality of first electrode tabs 131 and the plurality of second electrode tabs 132 so that the charging rate is uniform.

Here, a switch 210 may be further provided in each of a connection line between the control unit 200 and the first electrode tab 131, a connection line between the control unit 200 and the second electrode tab 132, and a connection line between the control unit 200 and the second auxiliary electrode tab 133. The switch 210 may disconnect or connect one or more of the plurality of first electrode tabs 131, disconnect or connect one or more of the plurality of second electrode tabs 132, and disconnect or connect the second auxiliary electrode tab 133 under the control of the control unit 200.

Figure 4:
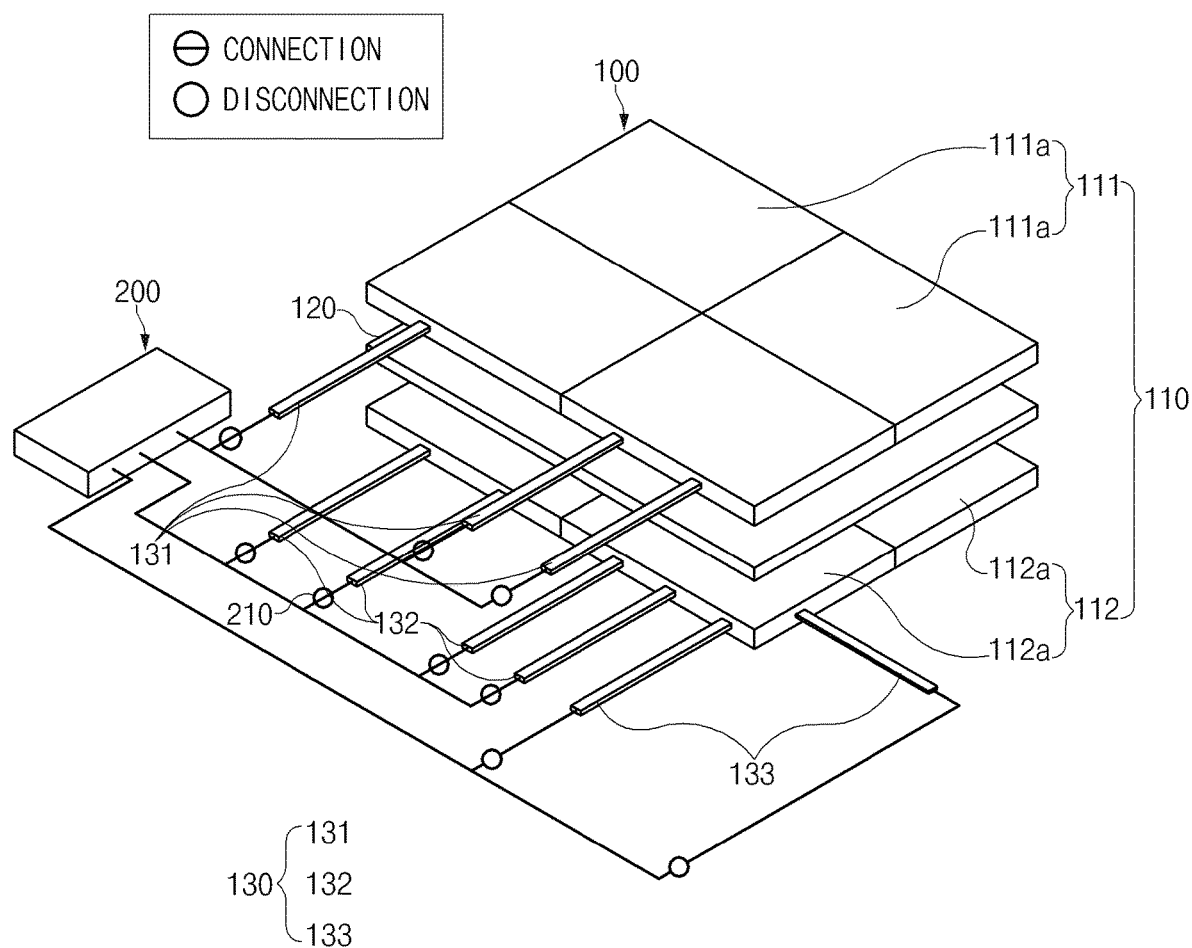

As a first example, as shown in FIG. 4, in the process of charging the electrode assembly, when the charging rate decreases while the second unit electrode 112 increases in resistance more than that of the first unit electrode, a portion of the plurality of first electrode tabs 131 provided on the first unit electrode 111 may be disconnected to match the charging rates of the first unit electrode 111 and the second unit electrode 112. As a result, the first unit electrode 111 may increase in resistance to decrease in charging rate, and thus, the charging rate of the first unit electrode 111 may match the charging rate of the second unit electrode 112.

Figure 5:
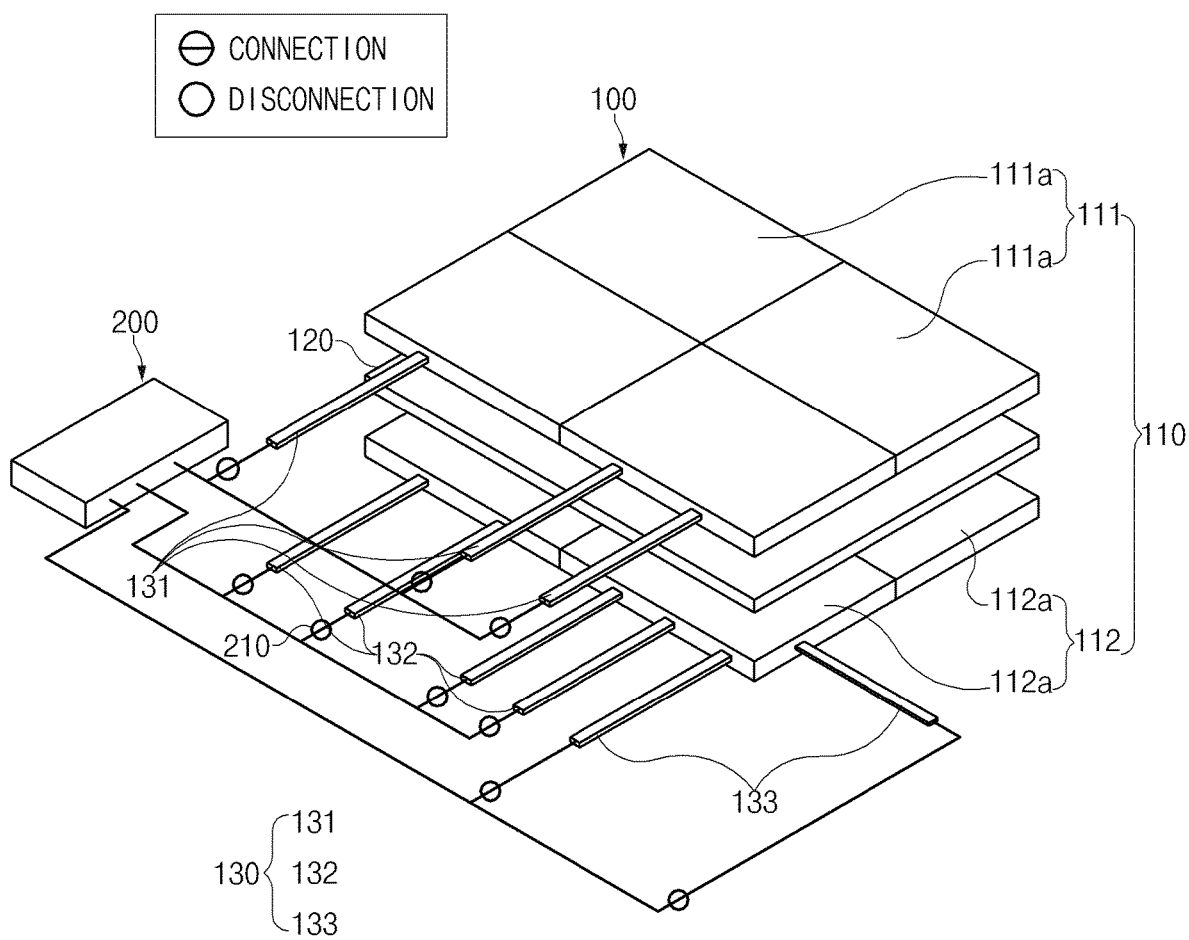

As a second example, as shown in FIG. 5, in the process of charging the electrode assembly, when the charging rate decreases while the second unit electrode 112 increases in resistance more than that of the first unit electrode, the second unit electrode 112 may be charged through the second auxiliary electrode tab 133 additionally provided on the second unit electrode 112 to match the charging rates of the first unit electrode 111 and the second unit electrode 112 so that the second unit electrode 112 decreases in resistance and increase in charging rate. Therefore, the charging rate of the second unit electrode 112 may match the charging rate of the first unit electrode 111.

Thus, in the secondary battery according to the first embodiment of the present invention, the charging rates of the first unit electrode and the second unit electrode may be uniformly adjusted by using the first electrode tabs and the second electrode tabs, which have different numbers. Accordingly, the performance of the secondary battery may be maintained or improved, and thus, the life cycle of the secondary battery may be extended.

[Method for Manufacturing Secondary Battery According to First Embodiment of the Present Invention]

Hereinafter, a method for manufacturing the secondary battery according to the first embodiment of the present invention will be described.

Figure 6:
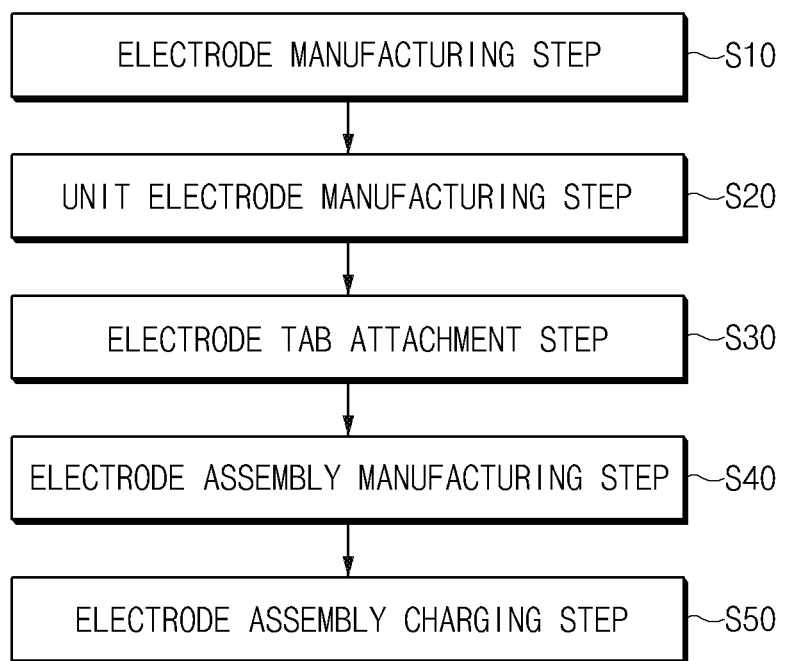
FIG. 6 is a flowchart illustrating a method for manufacturing the second battery according to the first embodiment of the present invention.

As illustrated in FIG. 6, a method for manufacturing the secondary battery according to the first embodiment of the present invention comprises an electrode manufacturing step (S10) of compressing a solid electrode mixture to manufacture a plurality of electrodes, a unit electrode manufacturing step (S20) of connecting the plurality of electrodes to each other to manufacture unit electrodes, an electrode tab attachment step (S30) of attaching an electrode tab 130 comprising first and second electrode tabs 131 and 132 to the plurality of unit electrodes, an electrode assembly manufacturing step (S40) of alternately laminating the plurality of unit electrodes, to which the electrode tab is attached, and a separator to manufacture an electrode assembly, and a charging step (S50) of charging the electrode assembly.

Electrode Manufacturing Step

The electrode manufacturing step (S10) comprises an electrode mixture manufacturing process and an electrode manufacturing process. In the electrode mixture manufacturing process, at least one or more of a solid conductive material and a solid binder are mixed with a solid electrode active material at a set ratio to manufacture the electrode mixture. For example, in the electrode mixture manufacturing process, a first electrode active material, the conductive material, and the binder are mixed with each other to manufacture a first electrode mixture, and a second electrode active material, the conductive material, and the binder are mixed with each other to manufacture a second electrode mixture.

In the electrode manufacturing process, the electrode mixture is inserted into a mold having the form of the electrode to strongly press the electrode mixture, thereby manufacturing an electrode. For example, the first electrode mixture is pressed to manufacture a plurality of first electrodes 111a, and the second electrode mixture is pressed to manufacture a plurality of second electrodes 112a. Here, each of the first electrodes 111a and the second electrodes 112a does not comprise a collector. Thus, each of the first electrode 111a and the second electrode 112a may have conductivity and adhesion on an entire surface thereof.

The electrode manufacturing step (S10) further comprises a process of dry mixing the electrode active material, the conductive material, and the binder under a high stirring rate condition.

For example, in a positive electrode manufacturing step, the positive electrode active material, the conductive material, and the binder are mixed with each other under the high stirring rate condition. Here, although not particularly limited, the positive electrode active material uses a general positive electrode active material, e.g., an alkali metal, an alkaline earth metal, a Group 13 element, a Group 14 element, a Group 15 element, a transition metal, a rare earth element, or lithium-containing metal oxide comprising a combination of the elements. Also, chalcogenide-based compounds may be also applied. As a non-limiting example, lithium transition metal oxide such as LiMxOy (M=Co, Ni, Mn, CoaNibMnc) (for example, lithium manganese composite oxides such as $LiMn_2O_4$, lithium nickel oxides such as $LiNiO_2$, lithium cobalt oxides such as $LiCoO_2$, and materials obtained by substituting a portion of manganese, nickel, and cobalt of the oxides with other general transition metals or lithium-containing vanadium oxide)-based positive active materials or a chalcogenide (for example, manganese dioxide, titanium disulfide, molybdenum disulfide, etc.)-based positive compounds may be applied.

More particularly, the positive electrode active material may be a lithium transition metal oxide-based positive electrode active material. For example, the positive electrode active material may be selected from the group consisting of $LiCoO_2$, $LiNiO_2$, $LiMn_2O_4$, $Li_4Mn_5O_{12}$, $LiFePO_4$, $Li(CoxNi1-x)O_2$ ($0.5 \le x < 1$), and $LiaNibCocX1dX_2eO_2$ (each of X1 and X2 independently represent at least one element selected from the group consisting of Mn, Al, Mg, Ti, Zr, Fe, V, W, Si, and Sn; where $0.8 \le a \le 1.3$, $0.1 \le b < 1.0$, $0.1 \le c < 1.0$, $0 \le d < 1$, $0 \le e < 1$).

The conductive material may be natural graphite, artificial graphite, carbon black, acetylene black-based or Gulf Oil Company products, Ketjen black, Vulcan XC-72, super P, cokes, carbon nanotube, Graphene or a mixture of one or more kinds of the materials.

The binder may comprise general binders used in the composition for forming the positive electrode. For example, polytetrafluoroethylene (PTFE), polyvinylidene fluoride (PVdF) or a copolymer thereof, styrene butadiene rubber (SBR), cellulose, and the like may be used as the binder.

In the stirring speed condition, a stirrer may operate at a stirring speed of 500 rpm to 5,000 rpm, preferably, 2,000 rpm to 3,000 rpm.

The binder may have a content of 0.5 parts to 20 parts by weight, preferably 5 parts to 10 parts by weight based on 100 parts by weight of the total weight of the positive electrode active material and the conductive material.

Unit Electrode Manufacturing Step

In the unit electrode manufacturing step (S20), the plurality of electrodes are connected to each other to manufacture a unit electrode having a novel structure. For example, in the unit electrode manufacturing step (S20), the plurality of first or second electrodes 111a or 112a are connected to each other in an area direction of the electrode to manufacture a first or second unit electrode 111 or 112 having a set area, the plurality of first or second electrodes 111a or 112a are connected to each other in a thickness direction of the electrode to manufacture a first or second unit electrodes 111 or 112 having a set thickness, or the plurality of first or second electrodes 111a or 112a are connected to each other in thickness and area directions to manufacture a first or second unit electrode 111 or 112 having a set area and thickness.

Particularly, in the unit electrode manufacturing step (S20), when the plurality of electrodes are irregularly connected to each other, a unit electrode having a shape of "⊏", "¬", "□", or "H" may be manufactured.

The unit electrode manufacturing step (S20) may further comprise a process of thermally fusing the electrode. In the process of thermally fusing the electrode, heat and a pressure may be applied to the unit electrode in which the plurality of electrodes are connected to each other to activate adhesion between the plurality of electrodes, thereby manufacturing an integrated unit electrode.

After the unit electrode manufacturing step (S20), an electrode tab attachment step (S30) of attaching an electrode tab 130 to the unit electrode 110 may be further performed.

Electrode Tab Attachment Step

In the electrode tab attachment step (S30), the plurality of first electrode tabs 131 are attached to the first unit electrode 111, and the plurality of second electrode tabs 132 are attached to the second unit electrode 112. Here, the first and second electrode tabs 131 and 132 may be attached to one or more of surfaces or edge surfaces of the first and second unit electrodes 111 and 112. Also, one or more second auxiliary electrode tabs 133 made of the same material as the second electrode tab 132 are attached to the second unit electrode 112.

Particularly, the electrode tab attachment step (S30) may further comprise a process of thermally fusing the electrode tab to more firmly attach the electrode tab. In the process of thermally fusing the electrode tab, heat and a pressure may be applied to the electrode tab attached to the unit electrode to more firmly attach the electrode tab to the unit electrode.

Here, the first electrode tab 131 and the second electrode tab 132 have different numbers.

For example, when the secondary battery is degraded due to the charging thereof, the positive electrode may decrease in resistance, and the negative electrode may increases in resistance. Accordingly, when the first electrode is the positive electrode, and the second electrode is the negative electrode, the number of first electrode tab 131 may be less than that of second electrode tab 132. Therefore, the first unit electrode and the second unit electrode may have uniform resistance or be minimized in resistance difference to improve the charging rate.

The electrode tab 130 may be formed as an electrode wire having flexibility and conductivity. Thus, although the electrode tab 130 attached to the unit electrode 110 is attached at an erroneous position, the position of the electrode tab 130 may be corrected through the flexibility of the electrode tab 130.

Electrode Assembly Manufacturing Step

In the electrode assembly manufacturing step (S40), an electrode assembly 100 is manufactured by interposing a separator 120 between the first and second unit electrodes 111 and 112. Also, all of the plurality of first electrode tabs 131, the plurality of second electrode tabs 132, and at least one second auxiliary electrode tab 133 are connected to the control unit 200.

Secondary Battery Manufacturing Step

The electrode assembly 100 is accommodated in a pouch together with an electrolyte to manufacture a secondary battery. Then, the electrode assembly charging step of charging the secondary battery is performed.

Electrode Assembly Charging Step

In the electrode assembly charging step (S50), a voltage is supplied to the electrode tab 110 to charge the electrode assembly 100 accommodated in the secondary battery. Here, in the electrode assembly charging step (S50), the charging rate may increase by minimizing the resistance difference between the first unit electrode 111 and the second unit electrode 112 provided in the electrode assembly 100 through the control unit 200.

For example, in the process of charging the electrode assembly, when the resistance of the second unit electrode 112 increases more than that of the first unit electrode 111 to decrease in charging rate, the control unit 200 disconnects a portion of the plurality of first electrode tabs 111a provided on the first unit electrode 111 to match the charging rates of the first unit electrode 111 and the second unit electrode 112 so that the first unit electrode 111 increases in resistance to decrease in charging rate.

For another example, in the process of charging the electrode assembly, when the resistance of the second unit electrode 112 increases more than that of the first unit electrode 111 to decrease in charging rate, the control unit 200 charges the second unit electrode 112 through the second electrode tab 132 and the second auxiliary electrode tab 133 to match the charging rates of the second unit electrode 112. Therefore, the second unit electrode 112 decreases in resistance to increase in charging rate.

A finished secondary battery of the present invention may be manufactured in the same manner as described above.

Hereinafter, in descriptions of another embodiment of the present invention, constituents of the second embodiment having the same constituent and function as the first embodiment have been given the same reference numeral in the drawings, and thus duplicated description will be omitted.

[Electrode Assembly According to Second Embodiment of the Present Invention]

Figure 7:
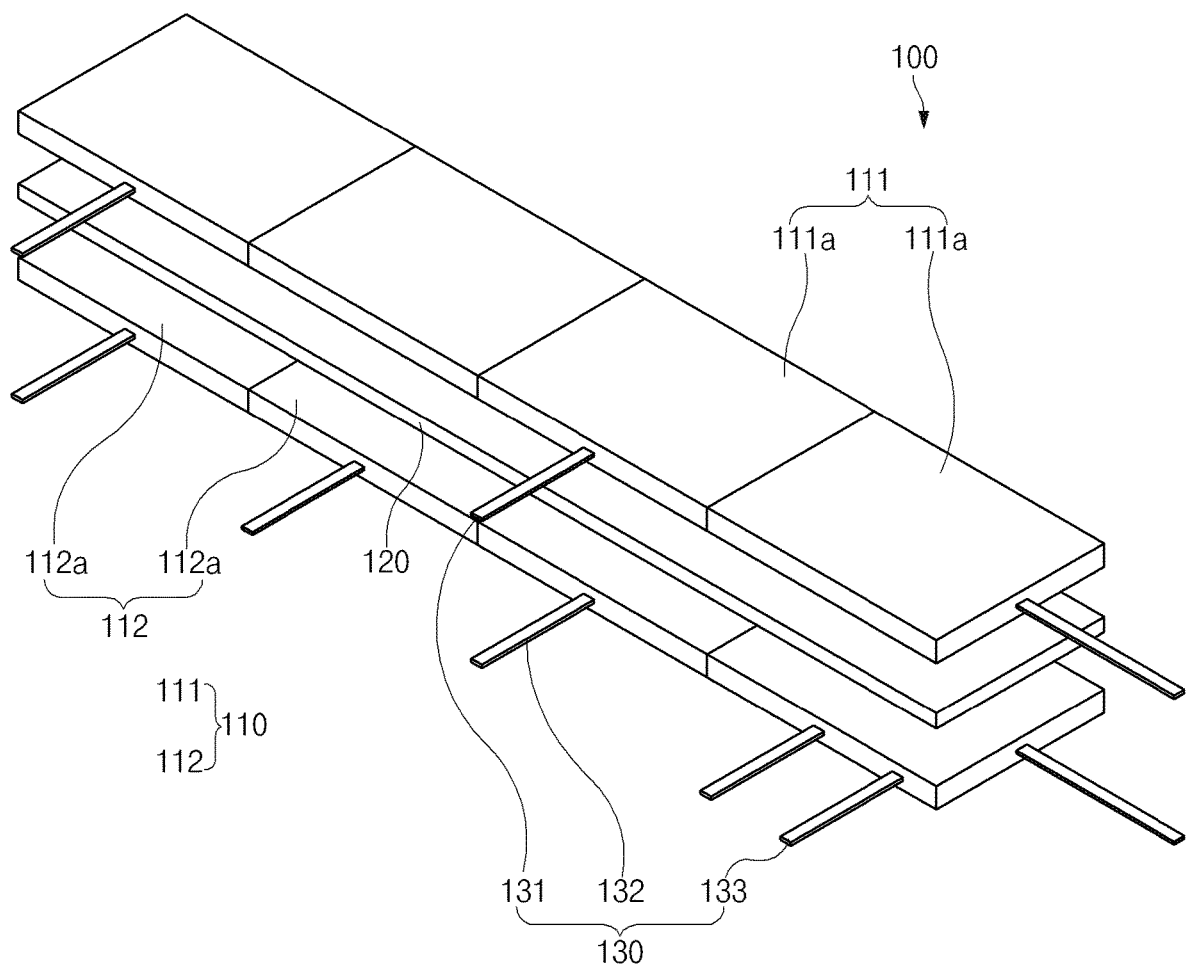
FIG. 7 is a perspective view of an electrode assembly according to a second embodiment of the present invention.

As illustrated in FIG. 7, in an electrode assembly according to a second embodiment of the present invention, a plurality of first electrodes 111a or a plurality of second electrodes 112a may lengthily extend in an one area direction of an electrode to realize a unit electrode 110 comprising a first unit electrode 111 and a second unit electrode, each of which has a predetermined length. Therefore, an electrode assembly 100 having a predetermined length and comprising the first unit electrode 111, the second unit electrode 112, each of which has the predetermined area, and a separator 120 may be realized.

[Electrode Assembly According to Third Embodiment of the Present Invention]

Figure 8:
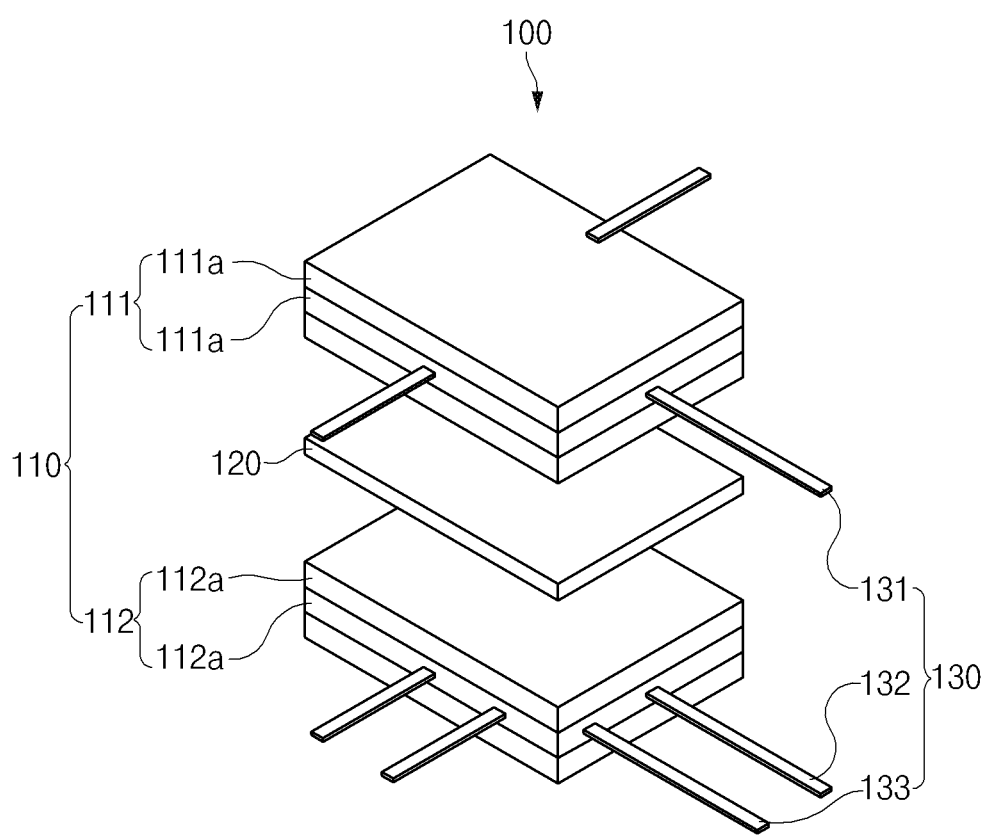
FIG. 8 is a perspective view of an electrode assembly according to a third embodiment of the present invention.

As illustrated in FIG. 8, in an electrode assembly according to a third embodiment of the present invention, a plurality of first electrodes 111a or a plurality of second electrodes 112a may be connected to each other in a thickness direction of an electrode to realize a unit electrode 110 comprising a first unit electrode 111 and a second unit electrode 112, each of which has a predetermined thickness. Therefore, an electrode assembly 100 having a predetermined thickness and comprising the first unit electrode 111, the second unit electrode 112, each of which has the predetermined thickness, and a separator 120 may be realized.

Alternatively, the plurality of first electrodes 111a or the plurality of second electrodes 112a may be connected to each other in all of an area direction and a thickness direction of the electrode to realize a unit electrode 110 comprising the first unit electrode 111 and the second unit electrode 112, each of which has a predetermined area and thickness. Therefore, an electrode assembly 100 having a predetermined area and thickness and comprising the first unit electrode 111, the second unit electrode 112, each of which has the predetermined area and thickness, and the separator 120 may be realized.

[Electrode Assembly According to Fourth Embodiment of the Present Invention]

Figure 9:
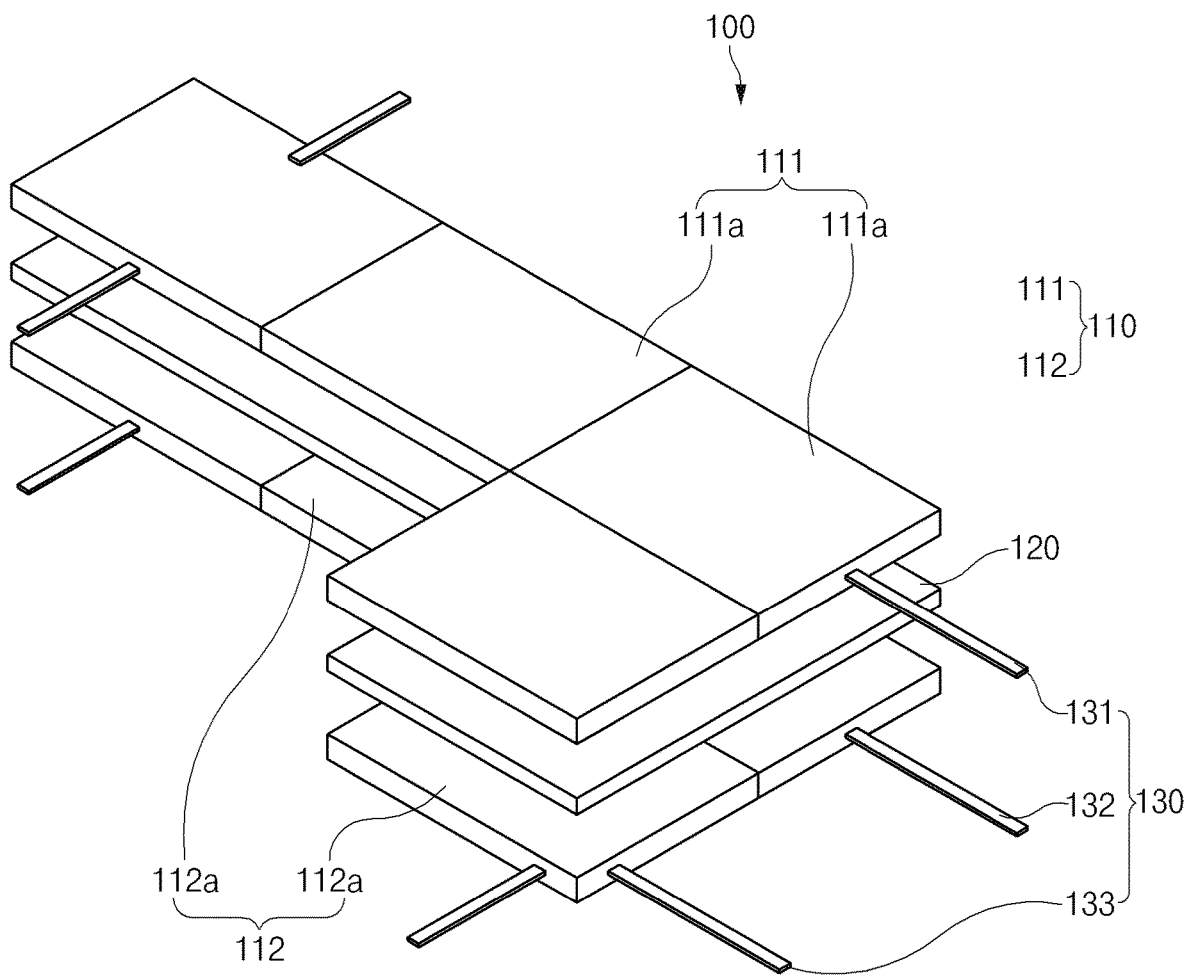
FIG. 9 is a perspective view of an electrode assembly according to a fourth embodiment of the present invention.

As illustrated in FIG. 9, in an electrode assembly according to a fourth embodiment of the present invention, a plurality of first electrodes 111a or a plurality of second electrodes 112a may be irregularly connected to each other in an area direction and thickness direction of an electrode to provide a unit electrode 110 comprising a first unit electrode 111 and a second unit electrode 112, each of which has a new shape. Therefore, an electrode assembly 100 having a new shape and comprising the first unit electrode 111, the second unit electrode 112, each of which has the new shape, and a separator 120 may be realized. Particularly, the unit electrode 110 and the electrode assembly 100 may be newly designed to match the inner space of a battery case that is designed to be compact through the irregular connection of the electrodes as described above to significantly improve marketability.

Alternatively, the plurality of first electrodes 111a or the plurality of second electrodes 112a may be connected to each other in directions different from each other to realize a unit electrode 110 comprising the first unit electrode 111 and the second unit electrode 112, which have shapes different from each other. Therefore, an electrode assembly 100 comprising the first unit electrode 111, the second unit electrode 112, which have the shapes different from each other, and the separator 120 may be newly designed.

That is, the number of first electrodes 111a and the connection direction of the first electrodes 111a may be different from the number of second electrodes 112a and the connection direction of the second electrodes 112a. For example, an electrode assembly having a structure that gradually decreases in width from the lowermost end to the uppermost end thereof, an electrode assembly having a screw shape that gradually rotates in one direction from the lowermost end to the uppermost end thereof, or an electrode assembly having a hollow defined in a vertical direction may be realized.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

The invention claimed is:

1. A secondary battery comprising an electrode assembly wherein the electrode assembly in a multilayer structure comprises:
a first unit electrode layer consisting of a plurality of first electrodes, wherein each of the first electrodes are directly connected to adjacent first electrodes, and each of the first electrodes consists essentially of a first electrode mixture having a solid shape without a collector;
a second unit electrode layer consisting of a plurality of second electrodes, wherein each of the second electrodes are directly connected to adjacent second electrodes, wherein each of the second electrodes consists essentially of a second electrode mixture having a solid shape without a collector;

a separator layer interposed between the first unit electrode layer and the second unit electrode layer; and an electrode tab comprising:
- a plurality of first electrode tabs attaching to a side surface of the first unit electrode; and
- a plurality of second electrode tabs attaching to a side surface of the second unit electrode, the plurality of first electrodes is a positive electrode, and the plurality of second electrodes is a negative electrode.

2. The secondary battery of claim 1, wherein a number of the first electrodes is different from a number of the second electrodes.

3. The secondary battery of claim 2, wherein, the number of first electrode tabs is less than the number of second electrode tabs.

4. The secondary battery of claim 3, further comprising a control unit configured to control the electrode assembly to be charged,
wherein the control unit adjusts a charging rate of each of the first unit electrode and the second unit electrode through the plurality of first electrode tabs and the plurality of second electrode tabs.

5. The secondary battery of claim 4, wherein, in a process of charging the electrode assembly, when the second unit electrode increases in resistance more than that of the first unit electrode to decrease in charging rate, the control unit disconnects a portion of the plurality of first electrode tabs provided on the first unit electrode to match the charging rates of the first unit electrode and the second unit electrode so that the first unit electrode increases in resistance to decrease in charging rate.

6. The secondary battery of claim 4, wherein the second unit electrode further comprises one or more second auxiliary electrode tabs,
wherein, in a process of charging the electrode assembly, when the second unit electrode increases in resistance more than that of the first unit electrode to decrease in charging rate, the control unit charges the second unit electrode through the plurality of second electrode tabs and the one or more second auxiliary electrode tabs to match the charging rates of the second unit electrode so that the second unit electrode decreases in resistance to increase in charging rate.

7. The secondary battery of claim 1, wherein the first electrode mixture comprises at least one or more of a conductive material and a binder, and
the second electrode comprises at least one or more of the conductive material and the binder with the second electrode mixture.

8. The secondary battery of claim 1, wherein the plurality of first electrodes or the plurality of second electrodes are connected to each other in an area or thickness direction of the electrode.

9. The secondary battery of claim 1, wherein the plurality of first electrodes are attached to each other with an adhesive property of a connection surface of each of the first electrodes, and
the plurality of second electrodes are attached to each other with an adhesive property of a connection surface of each of the second electrodes.

10. The secondary battery of claim 9, wherein the first unit electrode has first uniform conductivity the second unit electrode has second uniform conductivity.

11. The secondary battery of claim 1, wherein the plurality of first electrode tabs or the plurality of second electrode tabs comprises an electrode wire having flexibility.

* * * * *